L. Y. SPEAR.
HULL CONSTRUCTION OF SUBMARINE BOATS.
APPLICATION FILED MAR. 13, 1911. RENEWED FEB. 27, 1915.
1,154,215.
Patented Sept. 21, 1915.
9 SHEETS—SHEET 9.
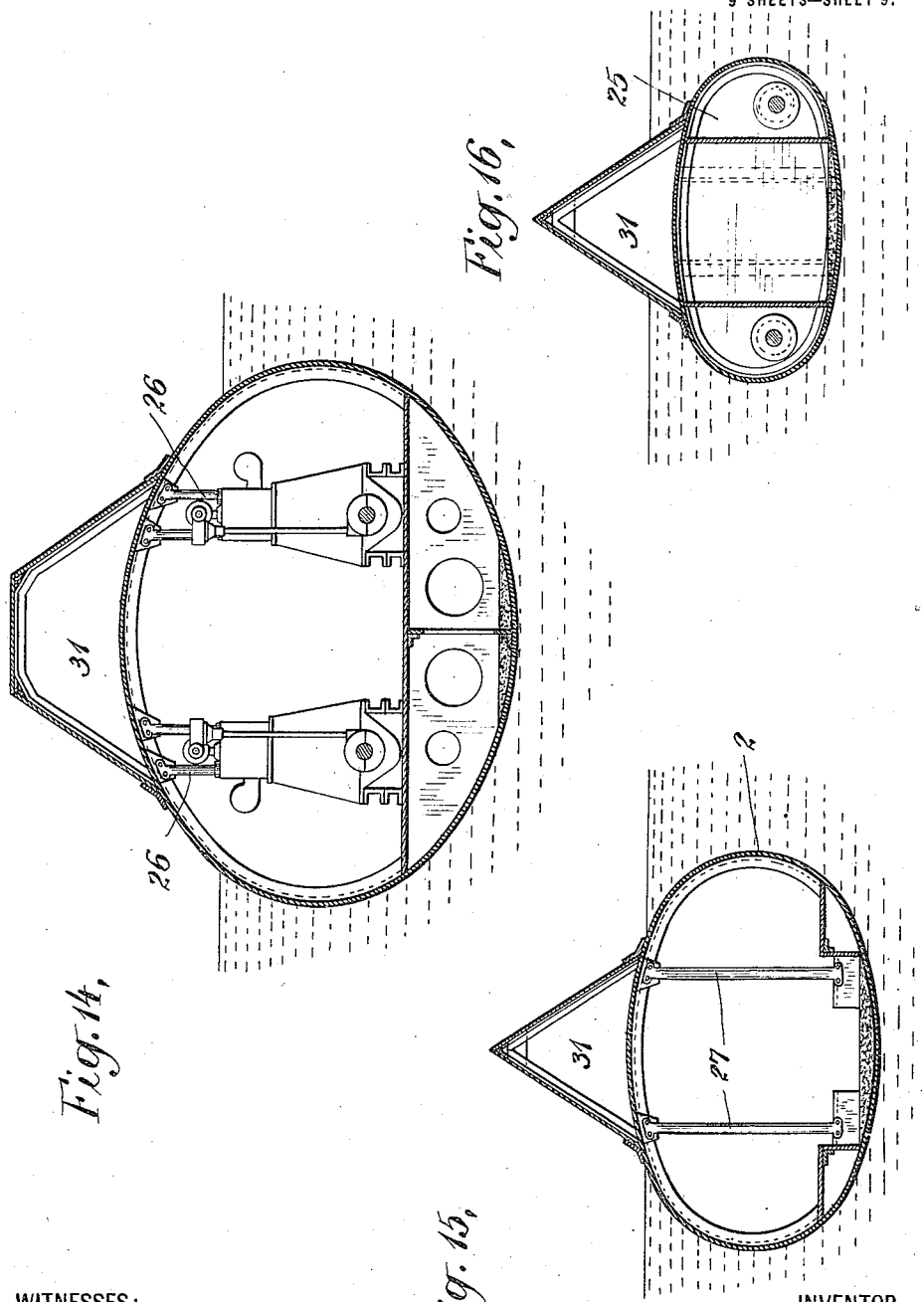
WITNESSES:
INVENTOR
Lawrence Y. Spear
BY
ATTORNEYS

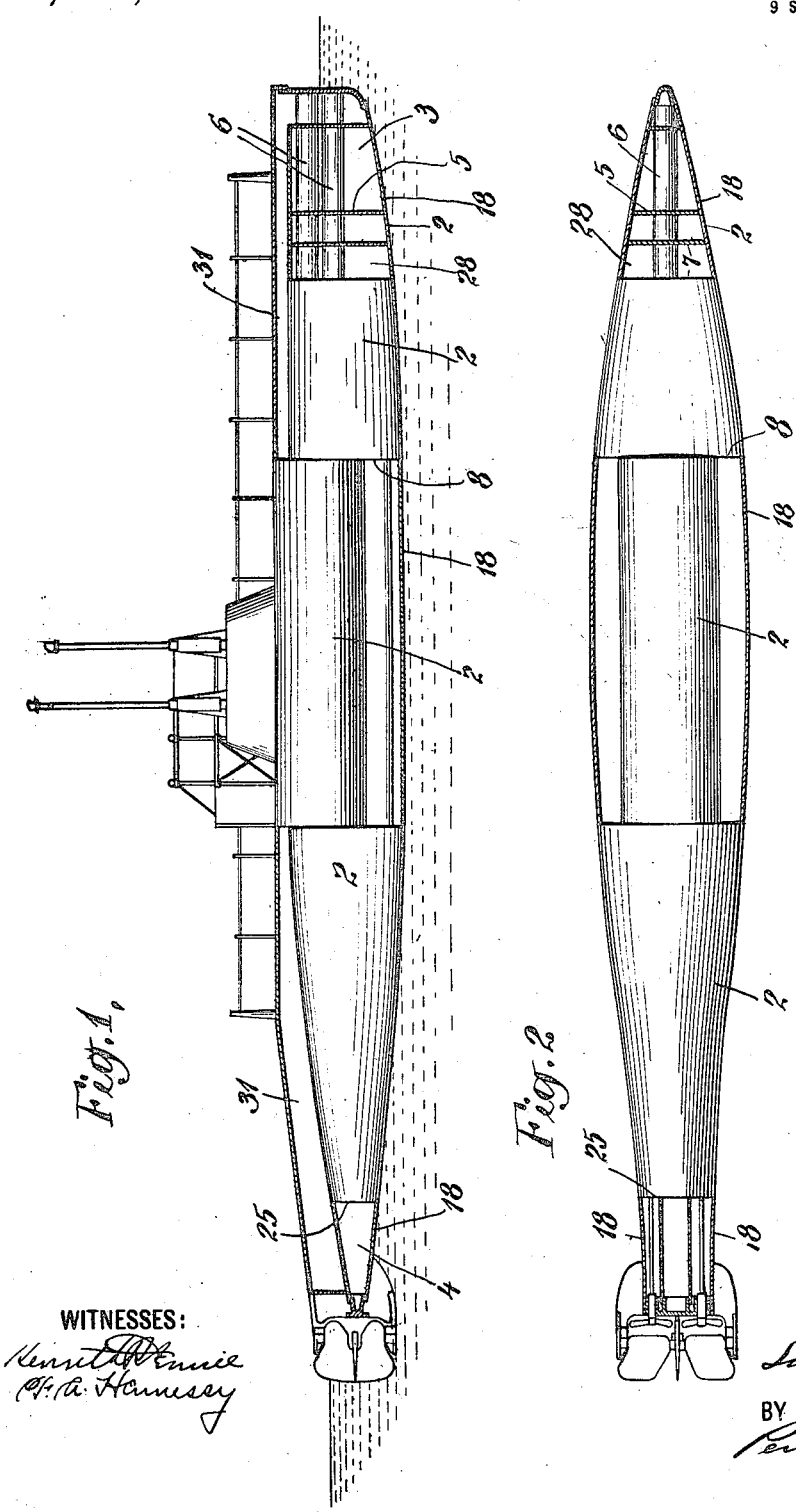

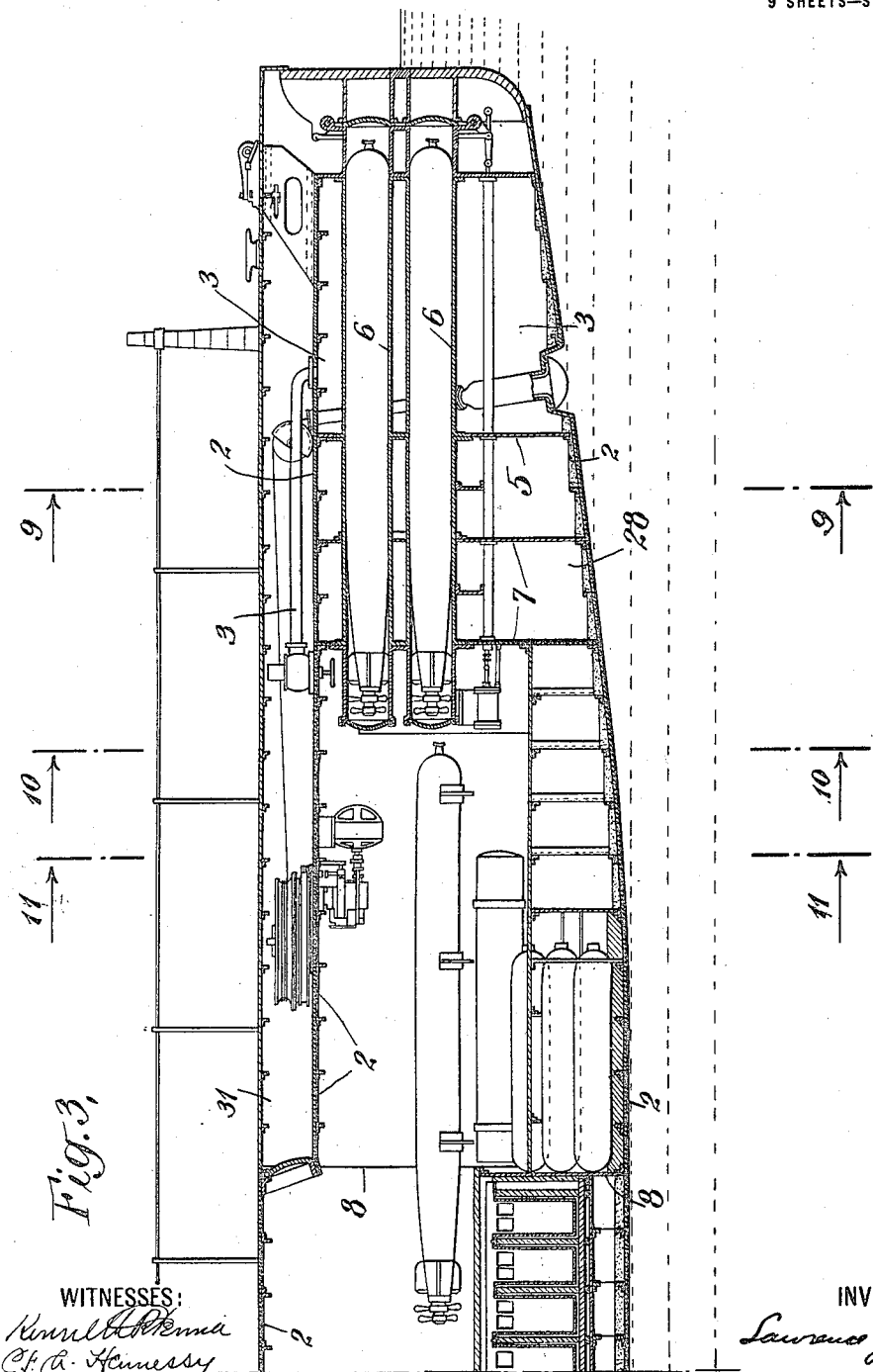

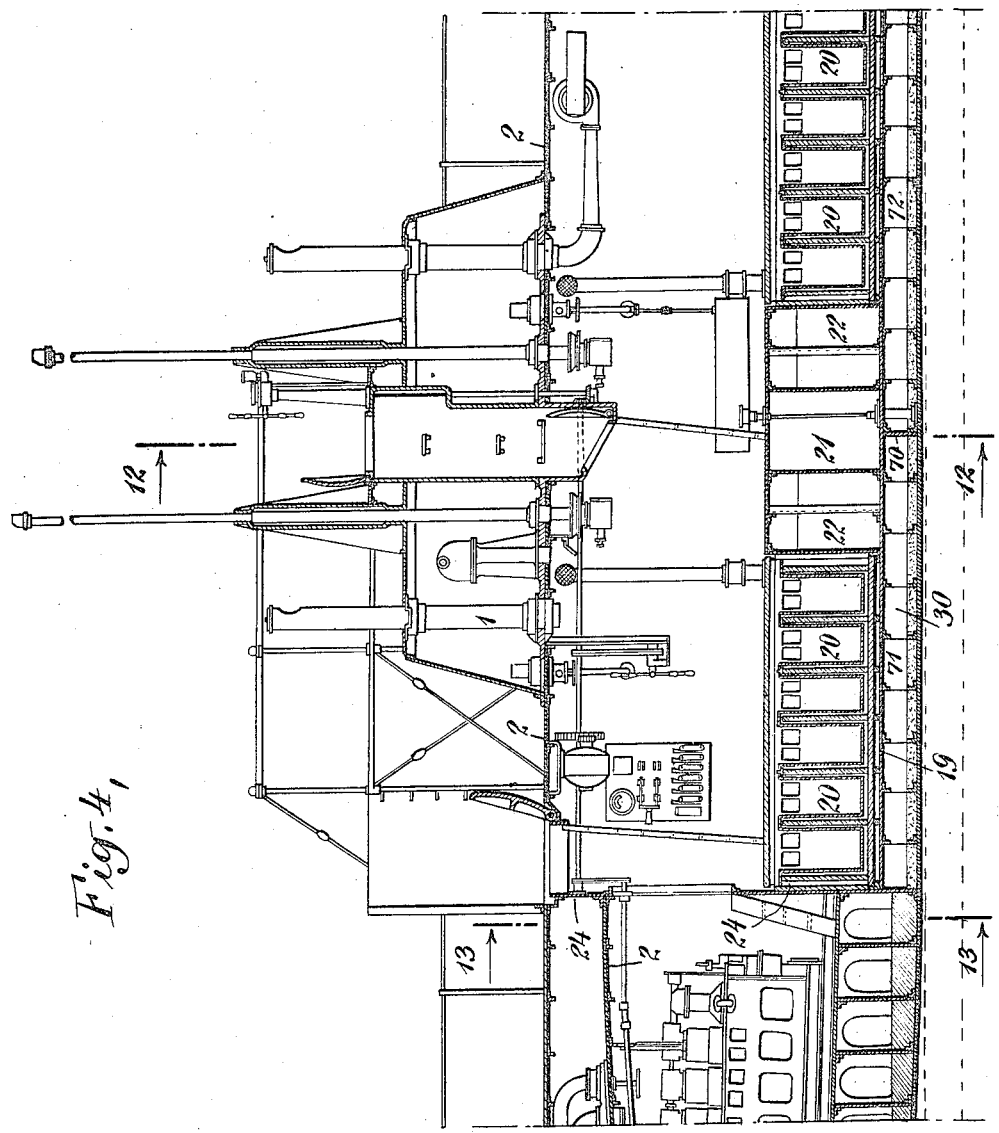

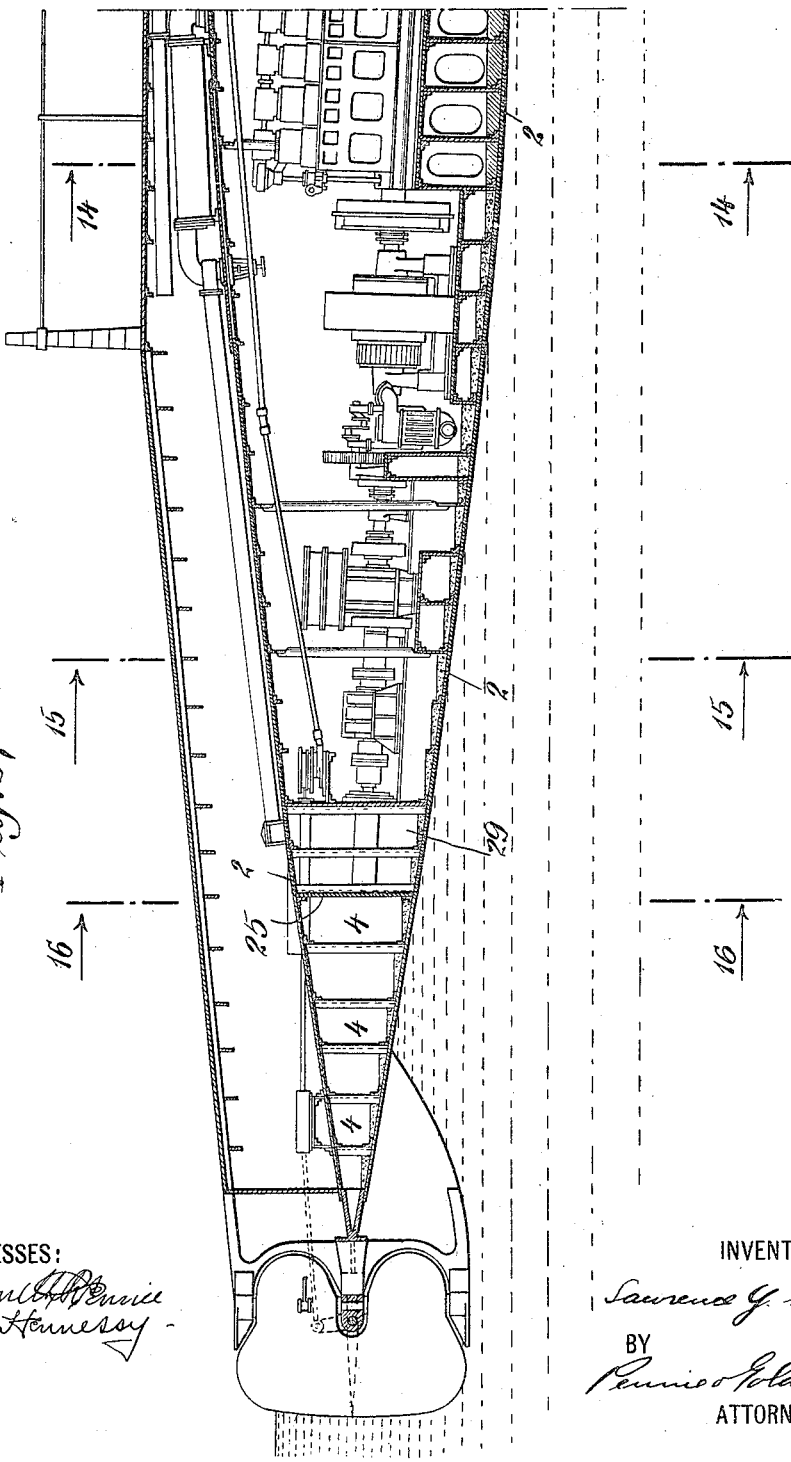

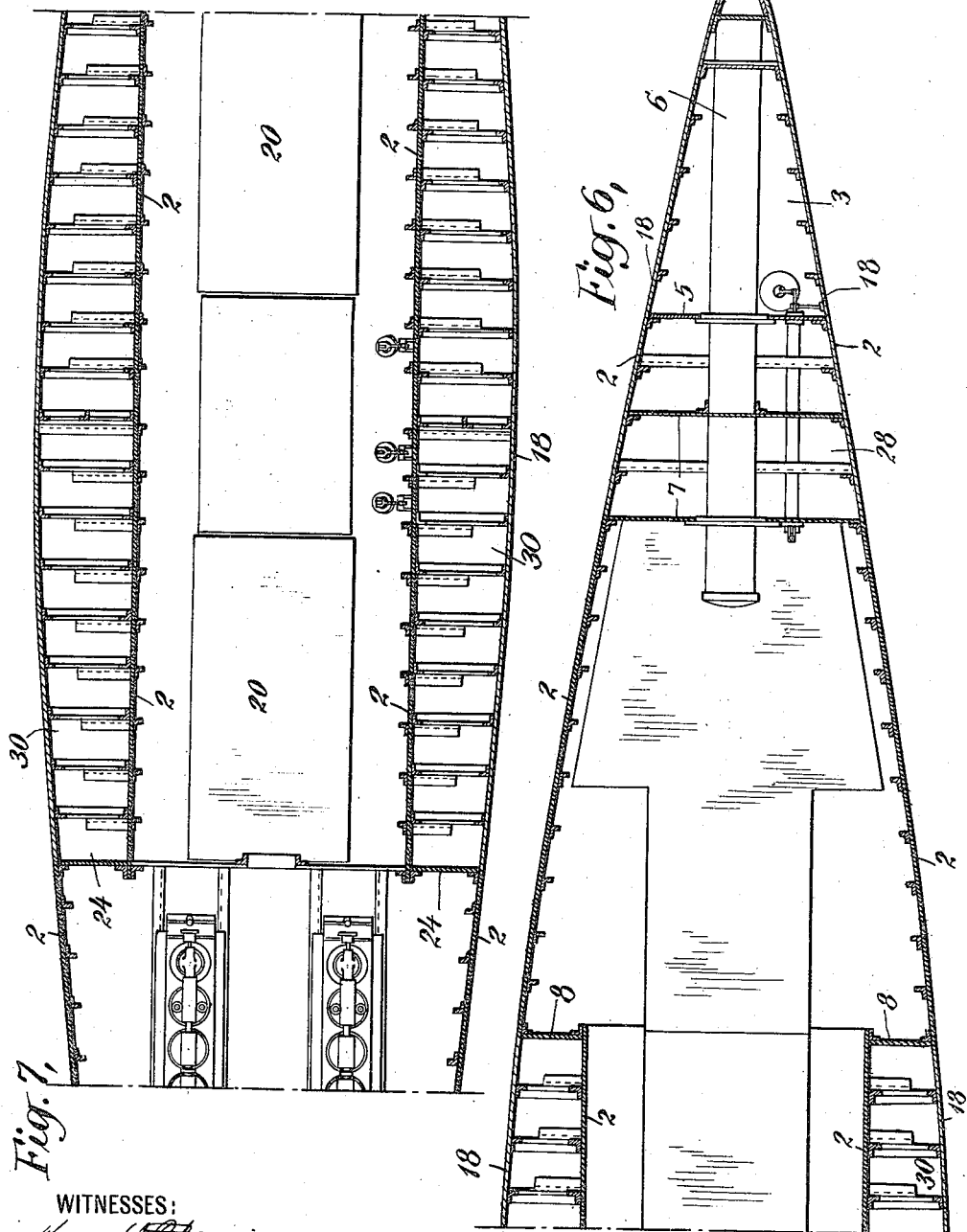

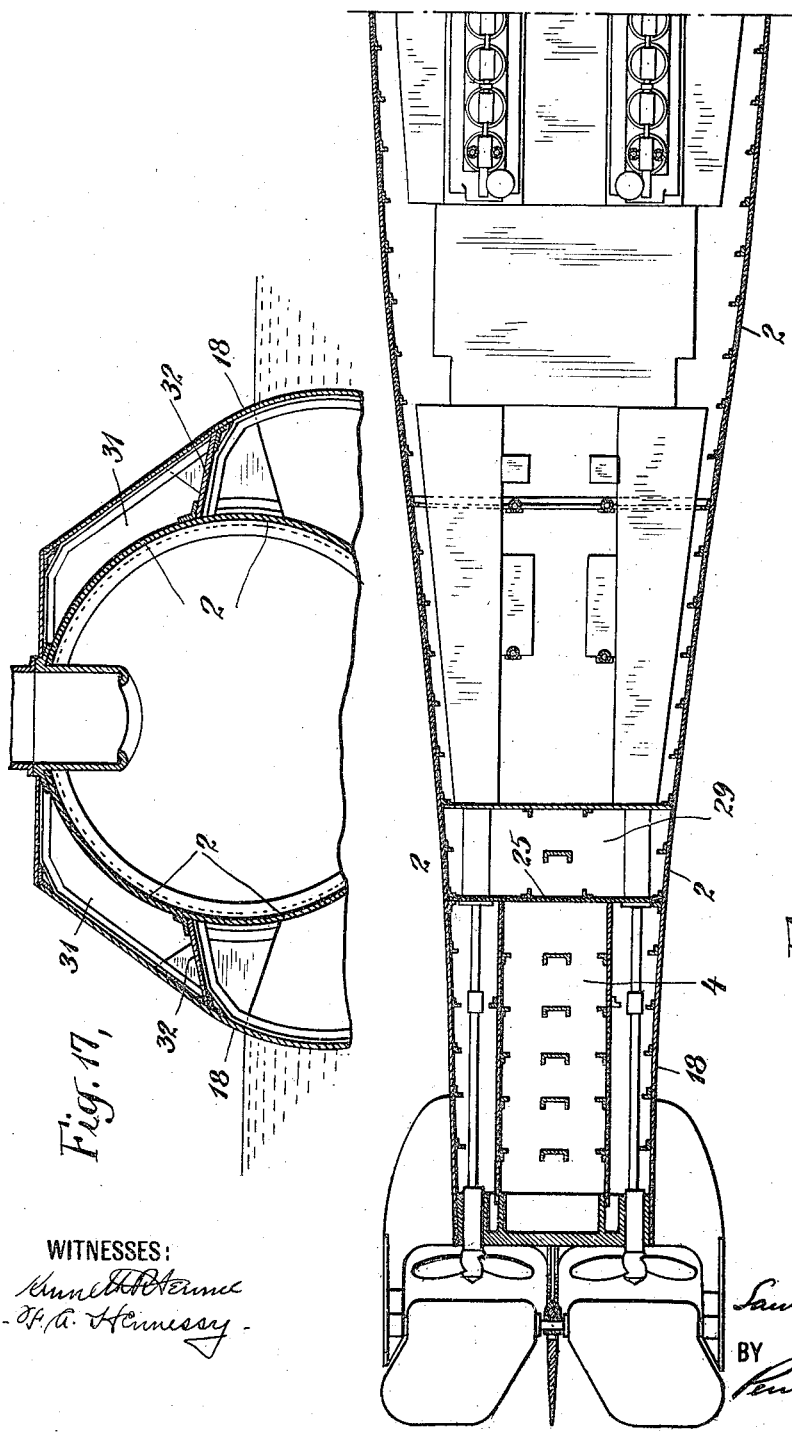

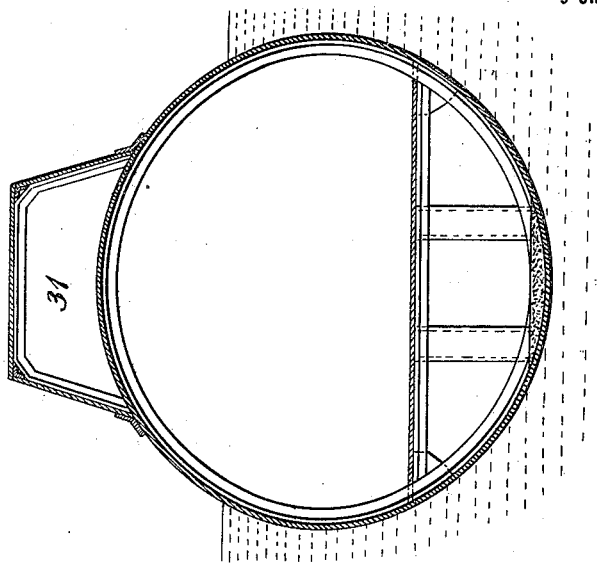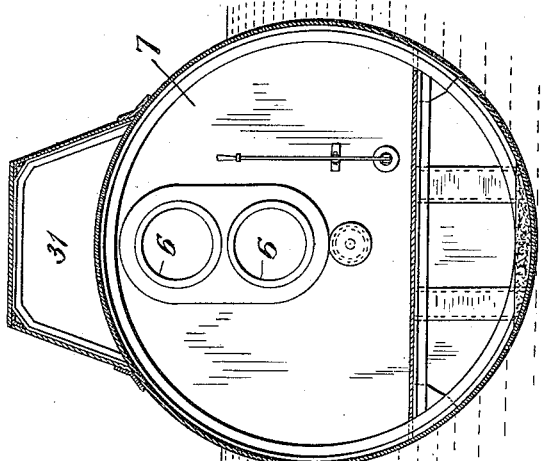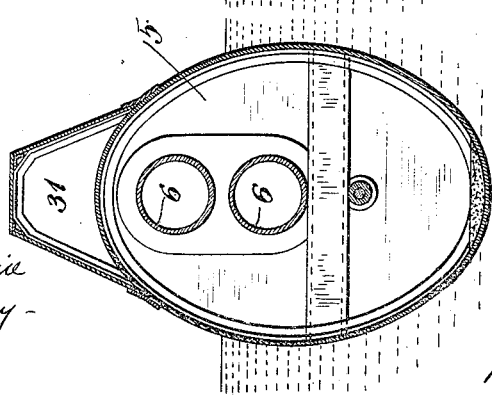

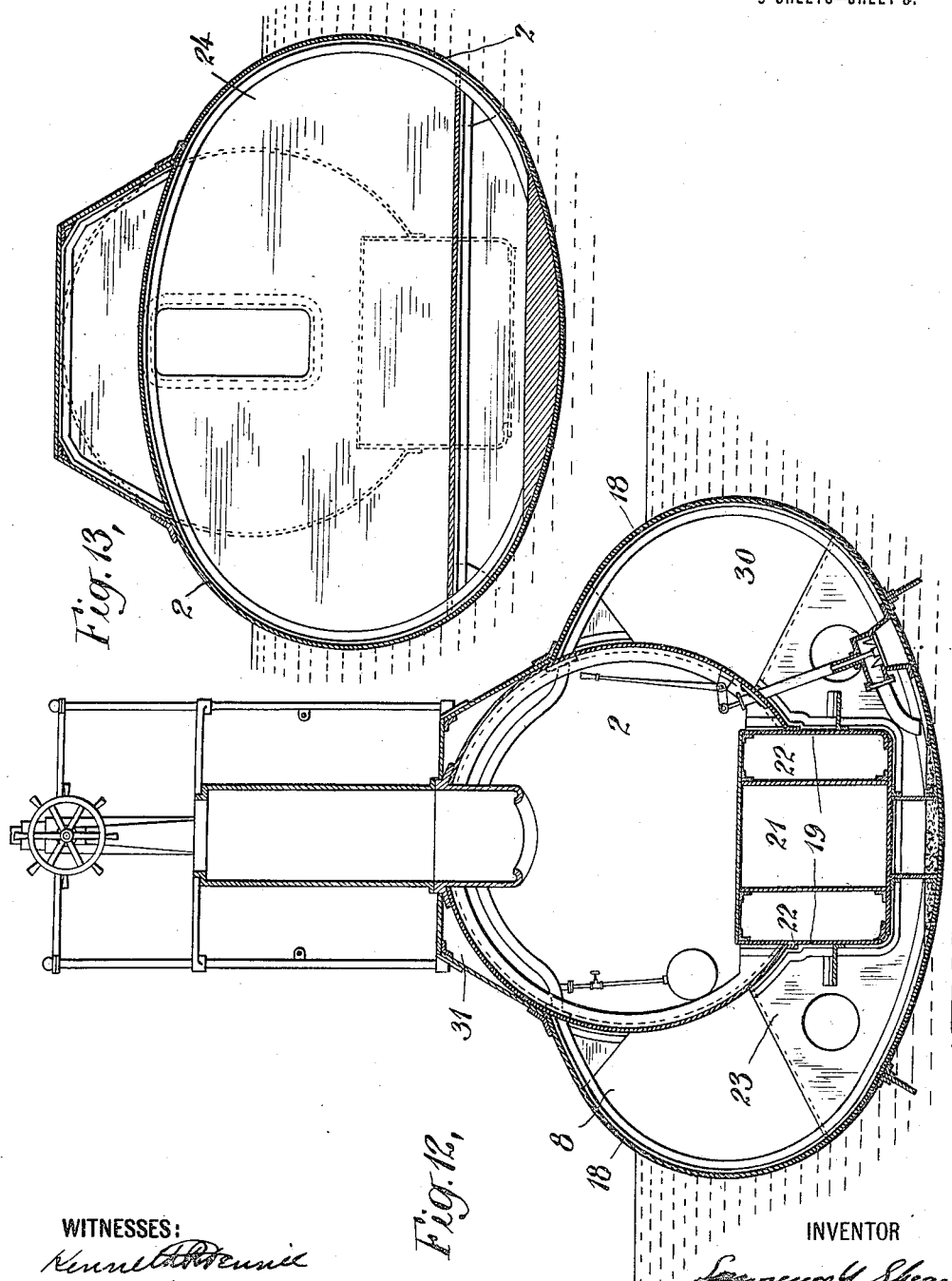

UNITED STATES PATENT OFFICE.

LAWRENCE Y. SPEAR, OF QUINCY, MASSACHUSETTS, ASSIGNOR TO ELECTRIC BOAT COMPANY, OF NEW YORK, N. Y., A CORPORATION OF NEW JERSEY.

HULL CONSTRUCTION OF SUBMARINE BOATS.

1,154,215.

Specification of Letters Patent.

Patented Sept. 21, 1915.

Application filed March 13, 1911, Serial No. 614,067. Renewed February 27, 1915. Serial No. 11,070.

*To all whom it may concern:*

Be it known that I, LAWRENCE Y. SPEAR, a citizen of the United States, residing at Quincy, county of Norfolk, State of Massachusetts, have invented certain new and useful Improvements in Hull Construction of Submarine Boats; and I do hereby declare the following to be a full, clear, and exact description of the invention, such as will enable others skilled in the art to which it appertains to make and use the same.

The primary objects of the invention are to provide a submersible vessel having a comparatively light structure capable of withstanding the external pressure resultant from deep submergence and which will admit of comparatively light surface draft with adequate stability on the surface and submerged and ample head room throughout the interior portions occupied by the crew in handling the vessel, and to simplify and improve the handling of the vessel by certain constructions and arrangements of the tank compartments hereinafter more fully set forth.

To this end the vessel is made up of an inner hull containing only those parts of the boat which are necessarily subjected to the pressure of deep submergence, which inner hull is made of such shape in cross section as to lend itself to a structure capable of resisting the greatest pressure to which it will be subjected in such submergence; and an outer hull of light construction not adapted to withstand the pressure of deep submergence and merging into the lines of the inner hull so as to complete the contour of the boat. The boat is equipped with a number of submergence tanks, including the main ballast tanks (preferably divided into forward, middle and after main ballast tanks); forward and after trimming tanks, an auxiliary ballast tank, and preferably an adjusting tank. The empty main ballast tanks supply a large element of buoyancy to the vessel running light, and, upon being filled, supply a large element of weight when the vessel is submerged; and they are so related in volume to the remainder of the vessel that when the main ballast tanks are full the vessel is nearly awash. During submergence these tanks are open to the sea and completely filled with water, and are not subjected to the pressure of submergence. In accordance with my invention they are located in the light outer hull. When it is desired to secure maximum stability submerged the boat should be designed with these tanks as low as possible on the contour of the vessel in order to give it the lowest practicable center of gravity. If, on the other hand, more stability on the surface is desired at the expense of submerged stability, the design will be such that the tanks are virtually raised or their shape altered so as to increase the area of the waterplane of flotation in the surface condition. When a minimum surface draft is required, these main ballast tanks, or that portion of them in wake of the inner hull, are made of broad beam and of minimum vertical height. The trimming tanks, on the other hand, are employed for the purpose of bringing the vessel to an even keel before submergence, and in practice are seldom or never completely filled, so that they must be capable of withstanding the pressure of deep submergence. The auxiliary ballast tank is employed for the purpose of overcoming such portion of the reserve buoyancy of the vessel as may be desired after the main ballast tanks are completely filled and the vessel is properly trimmed fore and aft by the trimming tanks. In practice this tank is seldom or never completely full, and it must therefore be capable of withstanding the exterior pressure due to deep submergence. The adjusting tank, if fitted, is equipped with a mechanism for accurately measuring the quantity of water admitted to and discharged from it. It is employed for the purpose set forth in U. S. Patents Nos. 772,970, dated October 25, 1904, and 805,496, dated November 28, 1905. This tank also is not necessarily full when submerged, and must therefore either be an internal tank or capable of withstanding the exterior pressure due to deep submergence. The trimming tanks are, in accordance with my invention, made a part of the strong inner hull, and in order to have the maximum effect for their intended purpose, are located at the extreme forward and aft portions thereof. The auxiliary ballast tank is likewise made a part of the inner hull, and should be so constructed and located, whether made of one or a plurality of compartments, that the center of gravity of its contents is in or near a vertical line passing through the center of gravity of the vessel submerged, so that the amount of water in it has little or no influence on the fore and after trim of the vessel. It is desirable, also, to arrange the design so that the same vertical line passes through or very near to the center of volume of emergence when the main ballast tanks are full and the vessel has been brought to an even keel, so that when the vessel is lowered in the water by filling the auxiliary tank, it will go down without disturbance of trim.

Many of the features of my invention are applicable to vessels of widely different configuration, as will be understood, but for the purpose of producing a boat with fine lines at the bow, and adapted for high speed, I have employed a construction having a stem portion of somewhat similar shape to an ordinary ship, that is, of considerable height in comparison to its width, and preferably merging into the torpedo tube shutters which complete the extreme forward end of the vessel. Such a hull construction does not lend itself to the resistance of great pressure, and I overcome this difficulty by making this high narrow portion of the hull a part of the light outer hull construction and using it as the forward main ballast tank. These main features of my invention, as well as important and novel details thereof, will best be understood from a consideration of the following description of the preferred form, reference being had to the accompanying drawings, in which:

Figure 1, represents a side elevation showing the outer hull in section. Fig. 2 represents a bottom view also showing the outer hull in section. Figs. 3, 4 and 5, represent on a larger scale bow, midship and stern portions respectively, in vertical section taken on the keel line. Figs. 6, 7 and 8, represent bow, midship and stern portions respectively in horizontal section through the center line of the vessel. Figs. 9, 10 and 11 represent vertical cross sections taken at lines 9—9, 10—10, and 11—11, respectively of Fig. 3 in the direction of the arrows. Figs. 12 and 13 represent vertical cross sections taken at lines 12—12 and 13—13 respectively of Fig. 4 in the direction of the arrows. Figs. 14, 15 and 16 represent vertical cross-sections taken at lines 14—14, 15—15, and 16—16 of Fig. 5 in the direction of the arrows. Fig. 17 represents a like view to Fig. 12 of a modified construction.

Referring to the drawings, the inner hull or strong hull 2, shown complete in Figs. 1 and 2, does not extend entirely to the bow, but is there completed by a compartment 3. This division of the hull of the vessel, if shaped to facilitate its progress through the water, as suggested above, is not well adapted to withstand exterior pressure equal to that encountered during deep submergence; therefore it is utilized in this construction as the forward ballast tank and is, as shown, provided with flooding arrangements whereby it may be thrown open to the sea upon submergence, relieving it of the crushing exterior pressure; as well as with connections to the compressed air supply (and to the pumps if desired) to provide for the expulsion of the water at such depths as may be considered safe.

The rear wall of the forward main ballast tank 3 is the bulkhead 5 which forms the front wall of the strong hull 2. Torpedo tubes 6. 6 extend through bulkhead 5 and two other bulkheads 7. 7. in the rear of bulkhead 5, whereby bulkhead 5 is considerably stiffened.

The space between the bulkheads 7 constitutes the forward trimming tank 28, and the space between forward bulkhead 7 and bulkhead 5 constitutes the torpedo compensating tank.

It will be seen, by referring to Figs. 9, 10 and 11 and their position on Fig. 3, that the forward part of the strong hull 2 is slightly elliptical with its major axis vertical, and is well adapted for exterior pressure-resisting construction. From this form it gradually merges into a tube circle as shown in Fig. 10 and then into an ellipse with its major axis horizontal at bulkhead 8, see Fig. 3, and from this point its outer surface is continued as outer hull 18 and the strong hull 2 is inclosed within it. The strong hull 2 is in greater part cylindrical, but embraces at its lower portion a box like rectangular structure 19, which forms part of the pressure resisting hull and accommodates the storage battery equipment 20, the adjusting tank 21. and the auxiliary ballast tank 22 at a low and convenient level. Throughout this central section of the boat, the strong hull 2 is stiffened by flanged cradle plates or braces 23 between it and the outer hull 18, and this bracing is principally applied to the box-like portion 19, and its junction with the cylindrical portion 2, to reinforce the strong hull at this point of weak shape.

The rear wall of this central double hulled section of the boat is bulkhead 24, shown in Figs. 4, 7 and 13. From the bulkhead 24 toward the stern to bulkhead 25 the single hull construction is again used and as its cross-section is substantially an ellipse with its major axis horizontal the hull is braced against exterior pressure by carrying up the engine frames 26. see Fig. 14, and by vertical stanchions 27. The frames of other translating devices necessary to the operation of the boat may be used in this way but the engine frames alone are so employed in the particular embodiment of the invention illustrated.

It will be understood that the particular form of inner and outer hull illustrated and just above described represents merely the preferred embodiment of the invention and that it is not essential to the invention that true elliptical contours be used. On the contrary these may be departed from to any extent desired, providing the section of single strong hull is of a form capable of being sufficiently reinforced to withstand deep submergence pressures. In a like manner, the main portion of the section of strong hull amidships, which is here shown as circular, in cross section, except where the rectangular tank breaks into it, need not necessarily be an exact circle, although that is the preferred form, giving the maximum strength with the minimum weight.

The portion of the strong hull just forward of the bulkhead 25 is divided off by a second complete transverse bulkhead, to form the after trimming tank 29, as shown in Figs. 5 and 8.

From bulkhead 25 to the stern of the vessel I may conveniently employ a structure supporting the twin propellers and which, proceeding from the ellipse with horizontal major axis at bulkhead 25, as shown in Fig. 16, merges through gradually flattening elliptical sections into a spectacle frame stern post, as illustrated in the accompanying drawings and fully described in my United States Patent No. 878,752 of February 11, 1908, and when such construction is used I leave the portion aft of bulkhead 25 open to the sea, and use it as a fuel tank if desired, in accordance with the disclosure of that patent. It will be understood, however, that this particular construction of stern forms no part of the present invention and the stern may be differently constructed to suit the requirements of any particular design. For example, if stern torpedoes are to be used the axis line of this stern section will be inclined or curved up, and the propeller shafts passed through stuffing boxes and supported by struts in the ordinary way. Or if the construction of stern according to Patent No. 878,752 is not desired, the strong hull construction may be carried so far aft as is consistent with the form and capable of being suitably reinforced to withstand deep submergence pressures. Abaft of such point, the stern construction would be similar to the bow but would be flooded and open to the sea when the vessel is submerged.

From the description it will be understood that in the preferred form illustrated the hull of the vessel is made up of the following sections: The extreme bow is a portion of the weak outer hull, and is used as forward main ballast tank, back at least to a point where the hull section is of such shape as to lend itself to a structure capable of resisting the pressure due to deep submergence. Then follows a section of single hull which passes from a forward portion of which the cross section is an ellipse with its major axis vertical, through a circular portion, into an after portion of which the cross section is an ellipse with its major axis horizontal. Then follows the midship section which is of double hull construtcion. The inner strong hull is generally circular in cross section, but is interrupted at the bottom to embrace the box-like portion 19. It will be observed that the inner strong hull midship section, which constitutes a substantial portion of the buoyancy of the vessel when submerged, has the center line of its volume located substantially above the center line of the volume of the forward and aft strong hull sections, and by virtue of this location adds to the stability of the vessel when it is running under water. It is, furthermore, of advantage to have this midship cylindrical section of strong hull extend above the single hull sections forward and aft of it, since thereby the emerging portion of the hull, when the ballast tanks are full, is quite symmetrical, so that the center of volume of emergence follows a straight vertical line, as the vessel is submerged. The space between the inner and outer hull of this double hull portion constitutes the main ballast tanks, and their volume is so related to the design of the vessel that when the main ballast tanks are filled, and the vessel is properly trimmed, the only portion of the hull out of water will be the upper part of the cylindrical inner hull section 2. The auxiliary ballast tank 22 is located at approximately the center of this double hull section, so that the center of gravity of its contents is in substantially the same vertical line with the center of volume of emergence when the main ballast tanks are filled, and when the auxiliary ballast tank, which is the last tank to be filled, is flooded, the vessel sinks in the water without appreciable disturbance of trim. Then aft of the double hull structure is a strong section of single hull construction, stiffened as may be necessary to suit conditions, the stiffening being obtained in the preferred construction, by the use of the frames of the translating devices as girders. The extreme tail is in the shape of a flat ellipse merging into a spectacle frame constituting the stern post, and is preferably non-pressure resisting, and may be left freely open to the water or used as a fuel storage tank, as explained.

The embraced lower box-like portion 19 of the midship section of strong hull contains the storage battery. In the particular embodiment shown the storage battery is divided into two parts, separated amidships by a midship well, though it is possible, and sometimes convenient, to locate all of the battery forward of the midship well. At the midship well, within the strong hull, are located the auxiliary tank 22, and within it the adjusting tank 21, which is a structural tank, formed by partitioning off the central portion of structure 19 as shown in Figs. 4 and 12.

The space 30, between the midship section of strong hull 2 and the outer hull 18, which is used as main ballast tankage, may be divided as desired. In the present instance it is shown divided at approximately the center of the boat by bulkhead 70, to form the after main ballast tank 71 and the middle main ballast tank 72. It will be observed that this tankage as illustrated is low down on the hull so as to be well submerged whenever the vessel is carrying water ballast. For the purpose of giving light surface draft this portion of the hull is, as shown, spread out broadly toward the bottom, which is nearly flat, and is of small height as compared with its width. This arrangement is well adapted to the combination of light surface draft with a large submerged stability and a good surface stability.

A superstructure inclosing space 31 is built throughout the entire length of the boat and serves to reinforce all of the before-mentioned sections, as well as to form a deck for the vessel. This superstructure is ordinarily non-water tight, and is provided with vents, and with scupper holes where it joins the hull, to render it self-bailing and self-filling. In the modified construction, shown in cross section, in Fig. 17, however, the midship outer hull section 18, instead of merging into the cylindrical midship section of the strong hull 2, is continued up outside thereof to form a midship superstructure section, which is divided from the main ballast tank, near the water line, by partitions 32. This midship superstructure section may be provided with flooding valves, and vents, so as to be used as a supplemental ballast tank. In such case, the flooding valve openings should be just above partitions 32, so that this portion of the superstructure will still be self-bailing and self-filling when the valves are left open.

Closures for sea inlets and air and pump connections are provided for all of the non-pressure resisting spaces which are intended for use as ballast tanks, the ballast tank space 30 in the middle section, the bow and stern tanks 3 and 4, and the superstructure space if it is made watertight, and they may be flooded or exhausted at will either singly or in combinations at such depths as their structure will permit.

It will be readily seen that the structural features described allow of an extremely strong and compact construction and arrangement with a minimum weight of material and it is thought that the following description of operation will best illustrate the coöperation of the several features of the invention.

The boat with all ballast tanks empty floats on the surface with considerable buoyancy which, before submergence, must be reduced to a comparatively small amount. To effect this, the superstructure valves (if a tight superstructure is fitted) are opened and the main ballast tanks filled. The vessel then settles low in the water and is trimmed fore and aft, as desired, by the admission of suitable quantities of water into one or both of the trimming tanks 28 and 29. After this is done, the only remaining buoyancy is that residing in the conning tower and in the upper portion of the midship strong hull section. So much of this remaining buoyancy as is desired is destroyed by admitting water to the auxiliary tank within the strong hull, the balance of the superstructure space filling as the vessel sinks. If an adjusting tank is fitted, final adjustment may be accomplished by its normal operation. Owing to the construction above described, the final operation of trimming is effected without any material change in the fore and aft trim of the vessel.

It is obvious that when a tight superstructure is fitted, additional buoyancy and stability may be obtained in a partially trimmed condition by postponing the flooding of the superstructure.

The wide variation of water displacement between the floating and submerged conditions of a vessel embodying the features of this invention and the small area exposed to pressure during the submergence permit of the construction of an efficient light or moderate draft submarine boat.

It is obvious that various changes may be made in the details of construction and arrangement without departing from the spirit of this invention.

I do not claim herein broadly the arrangement by which the main ballast tanks are so related in volume to the vessel as to leave only the symmetrical upper portion of the midship section of the strong hull out of water when the main ballast tanks are flooded, together with an auxiliary tank having the center of gravity of its contents on or near the vertical line passing through the center of volume of emergence, because this projecting portion of the hull constitutes the symmetrical buoyant protuberance of United States Patent No. 848,872 granted to T. S. Bailey and myself on April 2, 1907.

In the appended claims I have termed the structure which is intended to withstand the pressure of deep submergence "strong hull," and the structure which is not required to withstand this pressure, and may therefore be of lighter and weaker construction.

"weak hull." I have also termed a tank which is not necessarily completely filled with water when the boat is deeply submerged, and which therefore would have to withstand the pressure of deep submergence, "a strong tank."

What I claim is:

1. A hull construction for submarine boats, comprising a double hulled midship section consisting of an inner strong hull and an outer weak hull, and single strong hull sections forward and aft of said midship section, the center line of the volume of the inner strong hull of the midship section lying above the center line of the volume of the forward and aft strong hull sections, said single strong hull sections forming continuations of the weak hull of said midship section; substantially as described.

2. A hull construction for submarine boats, comprising a double hulled midship section consisting of an inner strong hull and an outer weak hull, single strong hull sections forward and aft of said midship section, the center line of the volume of the inner strong hull of the midship section lying above the center line of the volume of the forward and aft strong hull sections, and the upper contour of the strong hull midship section rising above the upper contours of the forward and aft sections, said single strong hull sections forming continuations of the weak hull of said midship section; substantially as described.

3. A submersible boat comprising an inner hull in greater part approximately cylindrical but having a rectangular under portion embraced by the cylindrical portion, an outer hull, and bracing between said inner and outer hulls uniting both hulls to render said inner hull resistant to exterior pressure.

4. In a submersible boat, a double hull section comprising a strong hull, a weak hull surrounding said strong hull, completing the contour of said section and providing an inter-hull space below and at the sides of said strong hull for use as ballast tanks which are completely filled with water during deep submergence, and a strong tank located in and occupying a portion of said inter-hull space; substantially as described.

5. A submersible boat comprising a strong hull designed to withstand the pressure of deep submergence, a weak hull affording main ballast tanks without said strong hull, and a superstructure open to the sea built upon said strong hull and separated from said main ballast tanks.

6. A submersible boat having a double hull midship section, the inter-hull area constituting main ballast tanks, the inner hull being substantially cylindrical to give great strength, and the outer hull being hung low on the inner hull and flaring outwardly to give a shallow draft when empty and a low center of gravity and great meta-centric height when filled.

7. A submersible boat having a strong hull comprising a forward portion merging from a generally elliptical cross-section with its major axis vertical at the forward end of the section, into a generally elliptical cross-section with its major axis horizontal at the after end of the section, a substantially cylindrical central section, and an after section the cross-section of which is generally elliptical with its major axis horizontal, in combination with an outer hull portion surrounding the central section of the strong hull and completing an unbroken contour with the forward and after sections thereof.

8. A submersible boat having a strong hull comprising a forward section merging from a generally elliptical cross-section with its major axis vertical at the forward end of the section into a generally elliptical cross-section with its major axis horizontal at the after end of the section, a substantially cylindrical central section, and an after section the cross-section of which is generally elliptical with its major axis horizontal, in combination with an outer hull portion surrounding the central section of the strong hull and completing an unbroken contour with the forward and after sections thereof and a high narrow bow section of weak hull constituting a ballast tank and merging into the forward end of the forward strong hull section.

9. A submersible boat having a strong hull comprising a forward section merging from a generally elliptical cross-section with its major axis vertical at the forward end of the section into a generally elliptical cross-section with its major axis horizontal at the after end of the section, a substantially cylindrical central section, and an after section the cross-section of which is generally elliptical with its major axis horizontal, in combination with an outer hull portion surrounding the central section of the strong hull and completing an unbroken contour with the forward and after sections thereof, said central section being raised above the forward and after sections to constitute a symmetrical buoyant protuberance amidship.

10. A submersible boat having a high narrow bow, the bow section being incapable of withstanding the pressure of deep submergence back at least to a point where the shape of the hull lends itself to a structure capable of withstanding such pressure, said weak bow section constituting a part of the water ballast system of the boat, a forward strong section of single hull into which the said bow section merges and which is suitably stiffened to withstand the pressure of deep submergence, a midship section of double hull construction, the space between the hulls constituting portions of the water ballast system of the boat, and an after strong section of single hull suitably stiffened to resist the pressure of deep submergence.

11. A submersible boat having a high narrow bow, the bow section being incapable of withstanding the pressure of deep submergence back at least to a point where the shape of the hull lends itself to a structure capable of withstanding such pressure, said weak bow section constituting a part of the water ballast system of the boat, a forward strong section of single hull into which the said bow section merges and which is suitably stiffened to withstand the pressure of deep submergence; a midship section of double hull construction, the space between the hulls constituting portions of the water ballast system of the boat, and an after strong section of single hull suitably stiffened to resist the pressure of deep submergence, the central double hull section being made up of an inner hull shaped to withstand the pressure of deep submergence and an outer hull completing the unbroken contour of the vessel amidship and not adapted to withstand the pressure of deep submergence.

12. A submersible boat having a high narrow bow, the bow section being incapable of withstanding the pressure of deep submergence back at least to a point where the shape of the hull lends itself to a structure capable of withstanding such pressure, said weak bow section constituting a part of the water ballast system of the boat, a forward strong section of single hull into which the said bow section merges and which is suitably stiffened to withstand the pressure of deep submergence, a midship section of double hull construction, the space between the hulls constituting portions of the water ballast system of the boat, an after strong section of single hull suitably stiffened to resist the pressure of deep submergence, and a final stern section incapable of withstanding such pressure but open to the water of submergence to enable it to resist such pressure.

13. A submersible boat having a high narrow bow, the bow section being incapable of withstanding the pressure of deep submergence back at least to a point where the shape of the hull lends itself to a structure capable of withstanding such pressure, said weak bow section constituting a part of the water ballast system of the boat, a forward strong section of single hull into which the said bow section merges and which is suitably stiffened to withstand the pressure of deep submergence, a middle section of double hull construction, the space between the hulls constituting portions of the water ballast system of the boat, an after strong section of single hull suitably stiffened to resist the pressure of deep submergence and a final stern section incapable of resisting such pressure but open to the water of submergence to enable it to withstand such pressure, the central double hull section being made of an inner hull shaped to withstand the pressure of deep submergence and an outer hull completing the unbroken contour and not adapted to withstand the pressure of deep submergence.

14. A hull construction for submarine boats, comprising a double hulled midship section consisting of an inner strong hull and an outer weak hull, and single strong hull sections forward and aft of said midship section, said single strong hull sections forming continuations of the weak hull of said midship section; substantially as described.

15. A hull construction for submarine boats, comprising a double hulled midship section consisting of an inner strong hull and an outer weak hull, single strong hull sections forward and aft of said midship section, said single strong hull sections forming continuations of the weak hull of said midship section, and bow and stern single weak hull sections forming continuations of said single strong hull sections; substantially as described.

16. A submersible boat having a strong hull, comprising a bow section having at its forward end a generally elliptical cross-section with its major axis vertical, a substantially cylindrical section, and an after section the cross-section of which is generally elliptical with its major axis horizontal, in combination with an outer hull portion surrounding the central section of the strong hull and completing an unbroken contour with the forward and after sections thereof.

17. A submersible boat having a strong hull, comprising a bow section having at its forward end a generally elliptical cross-section with its major axis vertical, a substantially cylindrical central section, and an after section the cross-section of which is generally elliptical with its major axis horizontal, in combination with an outer hull portion surrounding the central section of the strong hull and completing an unbroken contour with the forward and after sections thereof, and a high, narrow bow section of weak hull constituting a ballast tank and merging into the forward end of the bow strong hull section.

18. A submersible boat having a strong hull, comprising a bow section having at its forward end a generally elliptical cross-section with its major axis vertical, a substantially cylindrical central section, and an after section the cross-section of which is generally elliptical with its major axis horizontal, in combination with an outer hull portion surrounding the central section of the strong hull and completing an unbroken contour with the forward and after sections thereof, said central section being raised above the forward and after sections to constitute a symmetrical buoyant protuberance amidship.

In testimony whereof I affix my signature, in presence of two witnesses.

LAWRENCE Y. SPEAR.

Witnesses:
F. L. BRAKE,
J. E. FITZGERALD, Jr.

Copies of this patent may be obtained for five cents each, by addressing the "Commissioner of Patents, Washington, D. C."